(12) United States Patent
Lafond et al.

(10) Patent No.: US 6,305,543 B1
(45) Date of Patent: Oct. 23, 2001

(54) CONTAINER FOR RETAINING MICROSCOPE SLIDES

(75) Inventors: André Lafond, St-Hilaire; Yanick Bertin, Verchères, both of (CA)

(73) Assignee: 3088081 Canada Inc., St-Hilaire (CA)

( * ) Notice: Subject to any disclaimer, the term of this patent is extended or adjusted under 35 U.S.C. 154(b) by 0 days.

(21) Appl. No.: 09/540,572

(22) Filed: Mar. 31, 2000

(51) Int. Cl.$^7$ .................................................. B65D 85/48
(52) U.S. Cl. .......................... 206/456; 206/425; 206/561; 53/475
(58) Field of Search ........................... 206/449, 454–456, 206/555, 459.5, 511, 561, 307.1, 308.3, 387.12, 387.14, 387.15; 220/459.05, 23.87, 533; 53/473, 475; 211/41.1, 41.12, 41.13, 41.14, 50

(56) References Cited

U.S. PATENT DOCUMENTS

| 2,701,635 | * | 2/1955 | Mills | 206/456 |
| 3,710,900 | * | 1/1973 | Fink | 206/456 |
| 3,850,296 | * | 11/1974 | Hirata et al. | 206/454 |
| 4,003,468 | * | 1/1977 | Berkman | 206/387.12 |
| 4,629,066 | * | 12/1986 | Howard | 206/387.15 |
| 5,253,756 | * | 10/1993 | Goekler | 206/307.1 |
| 5,833,062 | * | 11/1998 | Yeh | 206/307.1 |
| 6,010,007 | * | 1/2000 | Moren et al. | 206/454 |

* cited by examiner

Primary Examiner—Luan K. Bui
(74) Attorney, Agent, or Firm—Quarles & Brady LLP

(57) ABSTRACT

The invention describes a container for retaining a plurality of microscope slides and comprises a base and a tray removably received on the bottom wall of the base; the tray displays a pair of laterally spaced longitudinally extending slide retaining compartments wherein each compartment includes a series of longitudinally spaced partitions, the spaces between the partitions and the distance between the opposite walls of the compartments are such as to receive the short sides of the rectangular shaped microscope slides; the spaces also enable the slides to be manually moved reciprocally between a frontwardly inclined position and a rearwardly inclined position. The width of the base is slightly greater than the width of three laterally vertically standing slides so that the slides may be stored in three lateral rows in the base when the tray is removed therefrom.

7 Claims, 6 Drawing Sheets

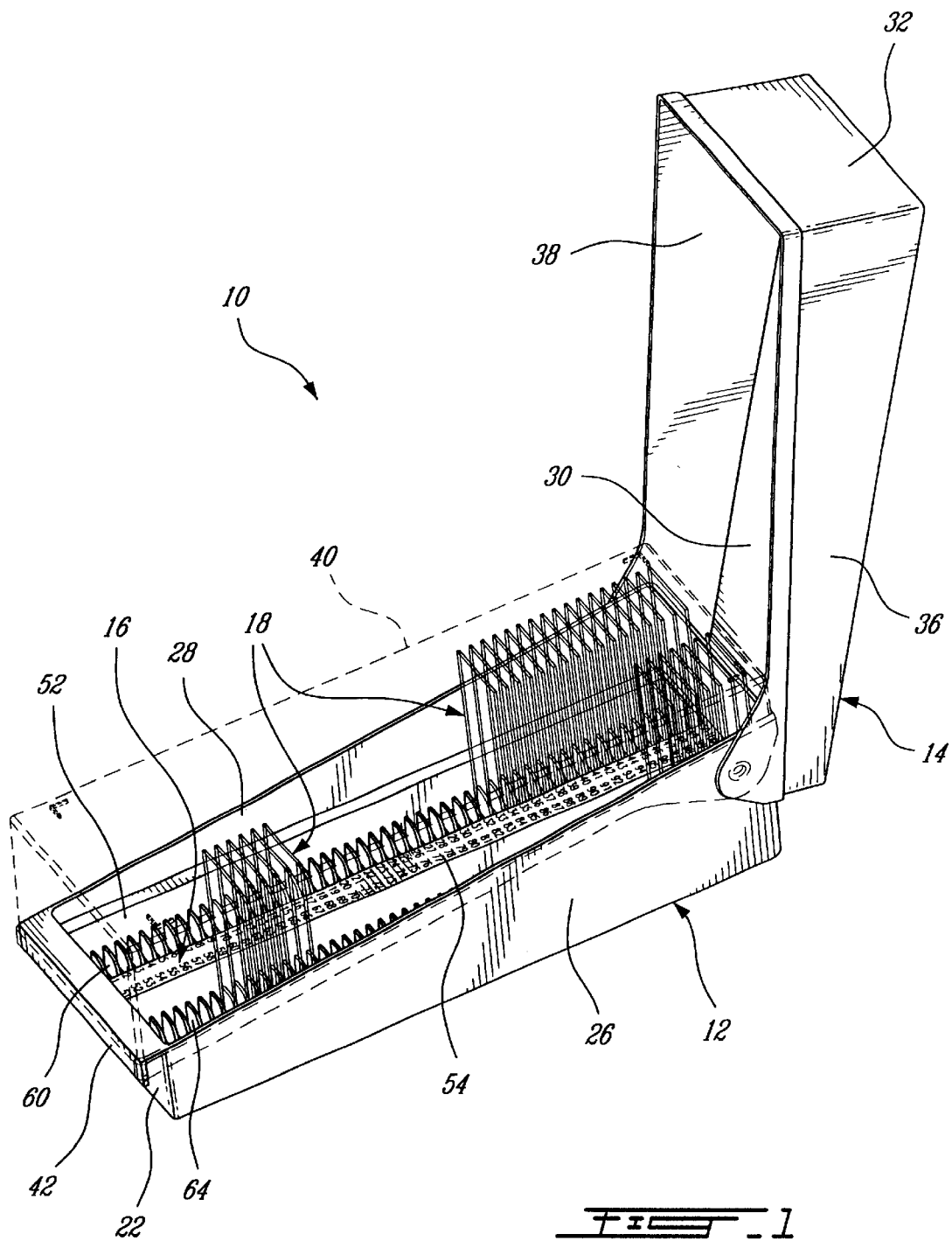

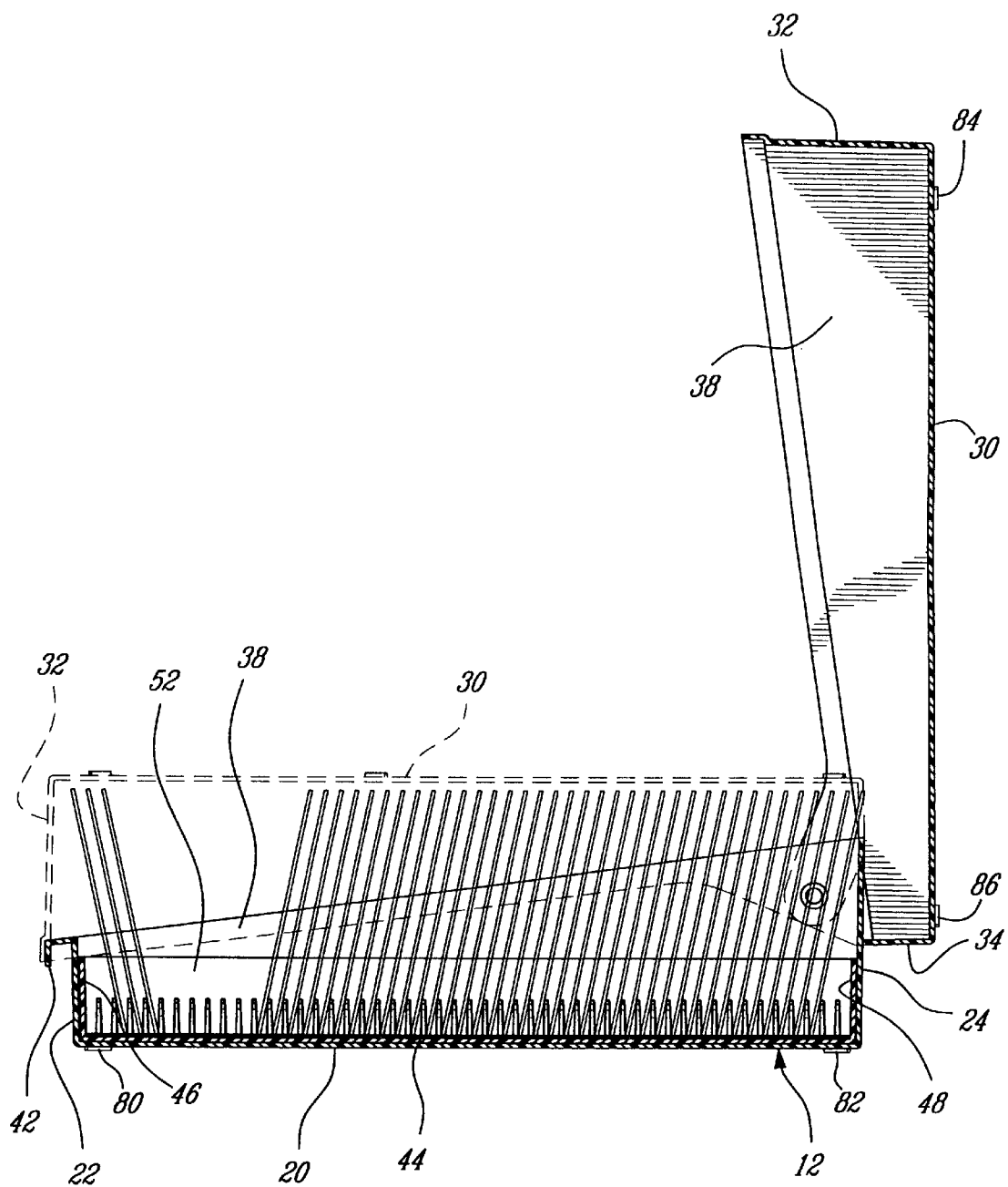

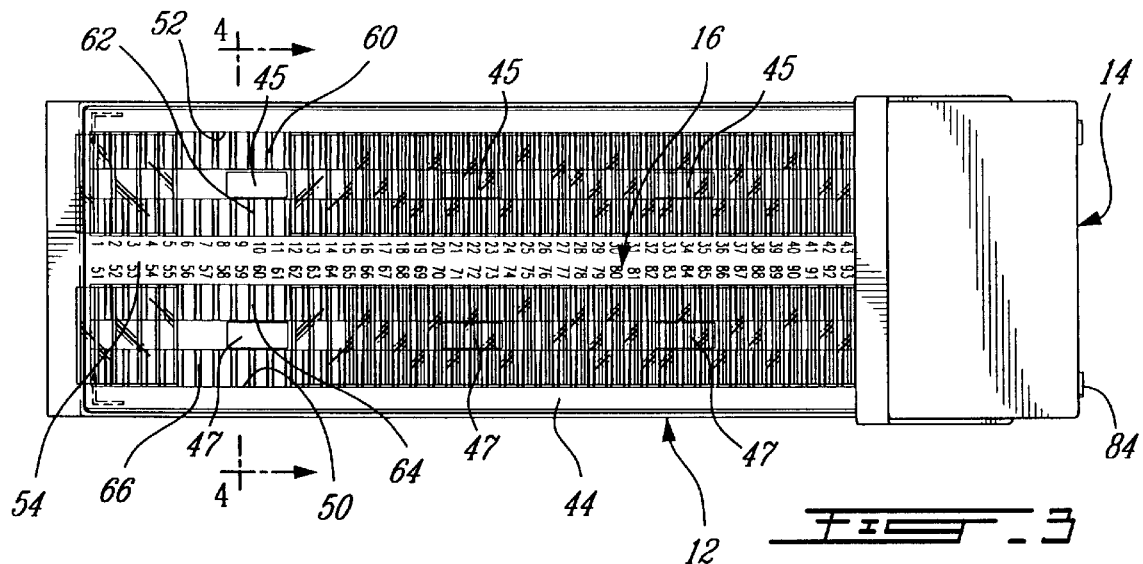
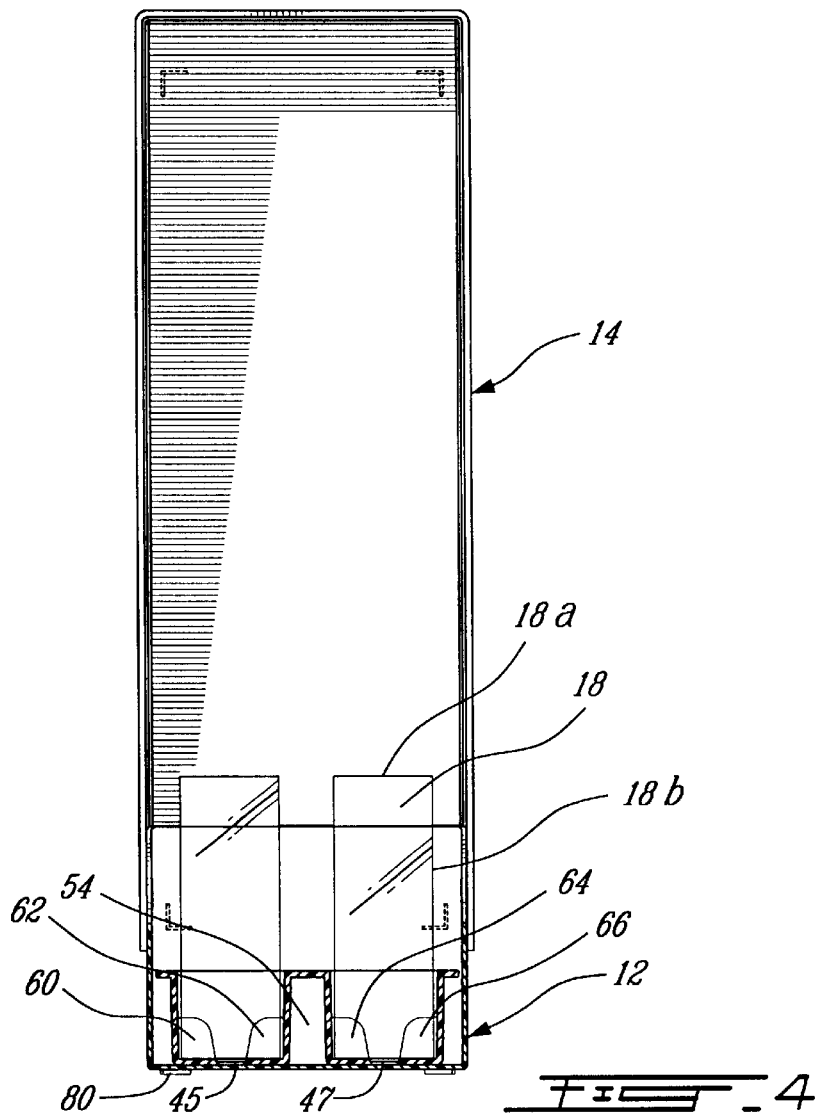

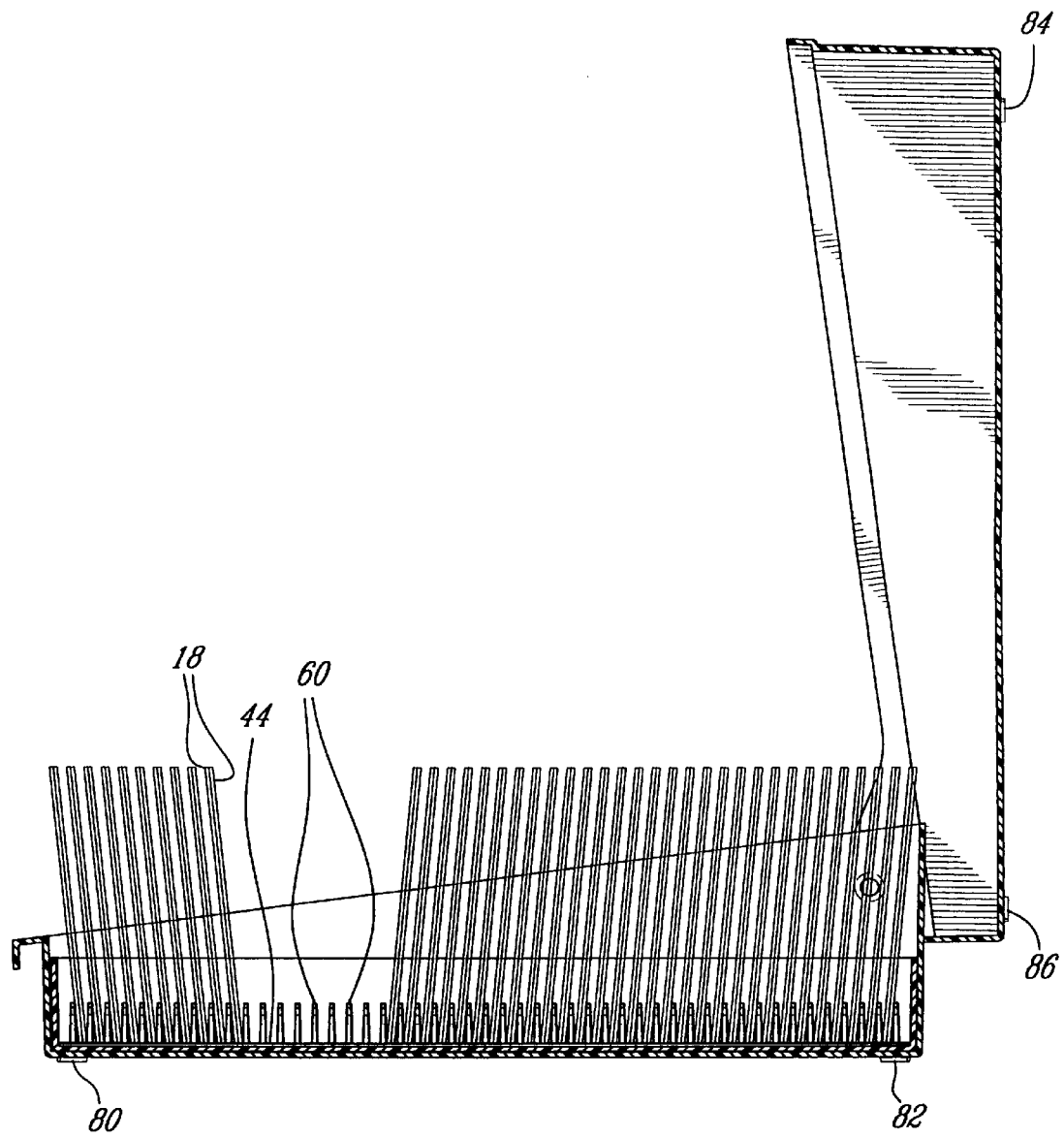

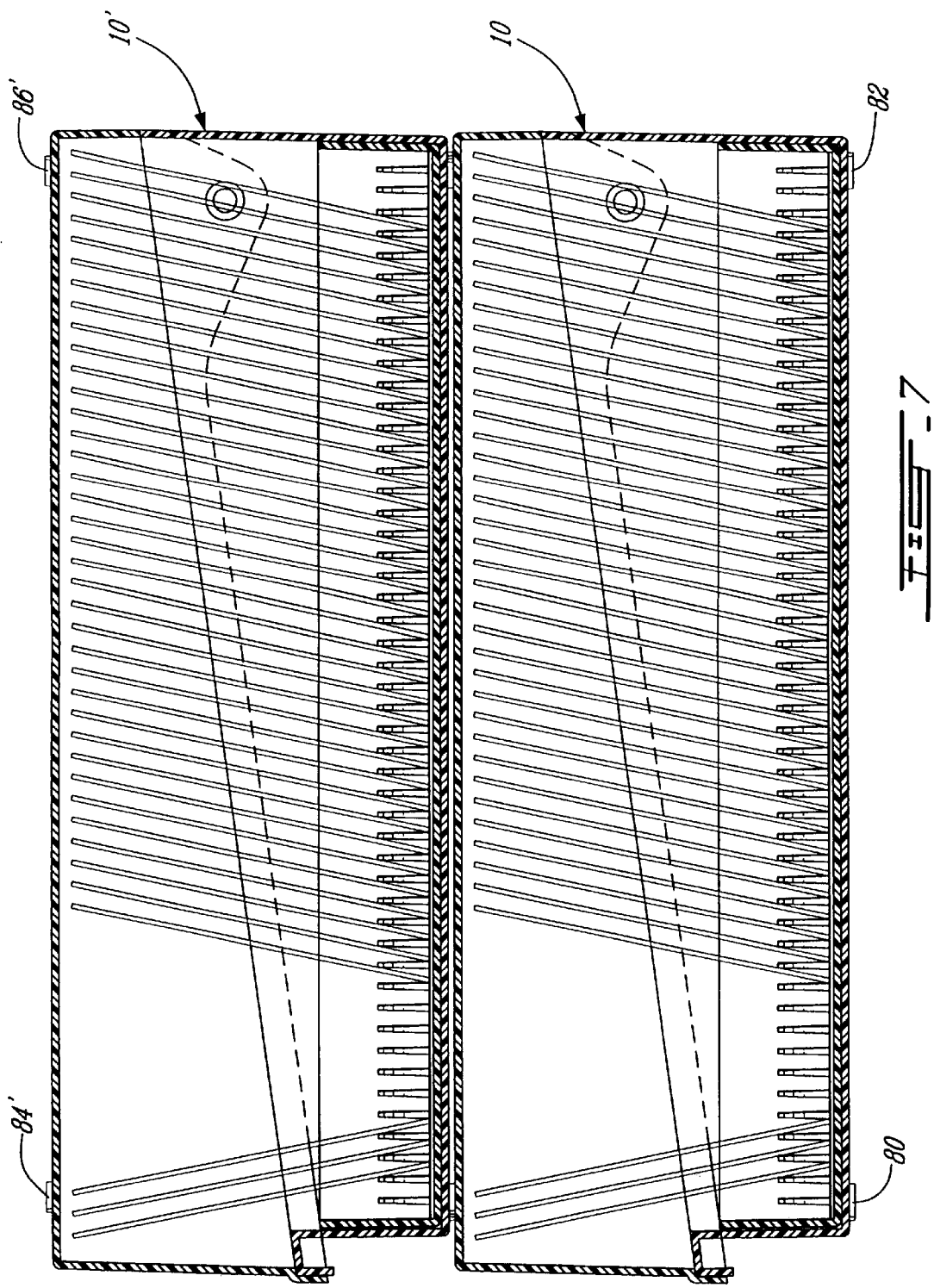

CONTAINER FOR RETAINING MICROSCOPE SLIDES

FIELD OF THE INVENTION

The present invention pertains to a container for retaining a plurality of microscope slides of rectangular shape having short and long sides and a predetermined thickness.

BACKGROUND OF THE INVENTION

Microscope slide containers are used for storing and indexing microscope analyzed specimens supported on a glass microscope slide. Such containers utilized for handling, transportation and storage of microscope slides include a plurality of individual microscope slide receiving compartments wherein each compartment is provided with protuberances extending upperly in each individual compartment for contacting the lower side of a microscope slide. In most cases, the slides which have a rectangular shape with long and short sides are usually placed in the compartments with the long sides extending horizontally, in other words, one of the long sides rests on the bottom wall of the compartment. In this position, it has been noted that the microscope slides can not be easily finger gripped for retrieval and inspection.

OBJECTS AND STATEMENT OF THE INVENTION

An object of the present invention to provide a container for receiving a plurality of microscopes slides of rectangular shape which avoids the above-described problem in that the slides are placed in the compartment resting on one of their short sides.

It is a further object of the present invention to provide a container for microscope slides where, in their upstanding position, the slides can be moved from a rearwardly inclined position to a frontwardly inclined position so that visual inspection of the slides can be made without requiring their retrieval from the compartments.

It is a further object of the present invention to provide a container for microscope slides wherein the spacing between the partitions which serve to hold the slides in their vertical position is such as to receive two contacting slides which can also be moved between a rearwardly inclined position and a frontwardly inclined position.

It is a further object of the present invention to provide a container for microscope slides so that the compartment tray can be removed and the slides retained in the container for storage.

The present invention is therefore achieved by providing a container for retaining a plurality of microscope slides of rectangular shape having short and long sides and a predetermined thickness which comprises:

- a base having a bottom wall, front and rear walls and opposite side walls;
- a tray removably received on the bottom wall of the base and contained within the front rear and side walls thereof;
- the tray displaying a pair of laterally spaced longitudinally extending slide retaining compartments; each compartment including a bottom wall and opposite side walls and a series of longitudinally spaced partition means; the spaces between the partition means and the distance between the opposite side walls of the compartments are such as to receive the short sides of the microscope slides; also the spaces are such that the slides may be allowed to be manually moved reciprocally between a frontwardly inclined position and a rearwardly inclined position.

In one form of the invention, the spaces between the partition means are slightly greater than the thickness of two contacting slides so that the slides may also move between a frontwardly and rearwardly inclined position.

In another form of the invention, the width of the bottom wall of the base between the opposite side walls is slightly greater than the width of three laterally vertically standing slides so that the slides may be stored in three lateral rows in the base when the tray is removed therefrom.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS:

FIG. 1 is a perspective view of a container made in accordance with the present invention;

FIG. 2 is longitudinal cross-section of the container;

FIG. 3 is a top plan view of the container;

FIG. 4 is a front elevation view;

FIG. 5 is a view similar to FIG. 2 showing two slides per compartment;

FIG. 7 is an elevational cross-sectional view of two stacked containers.

DESCRIPTION OF PREFERRED EMBODIMENTS

Figure 6:
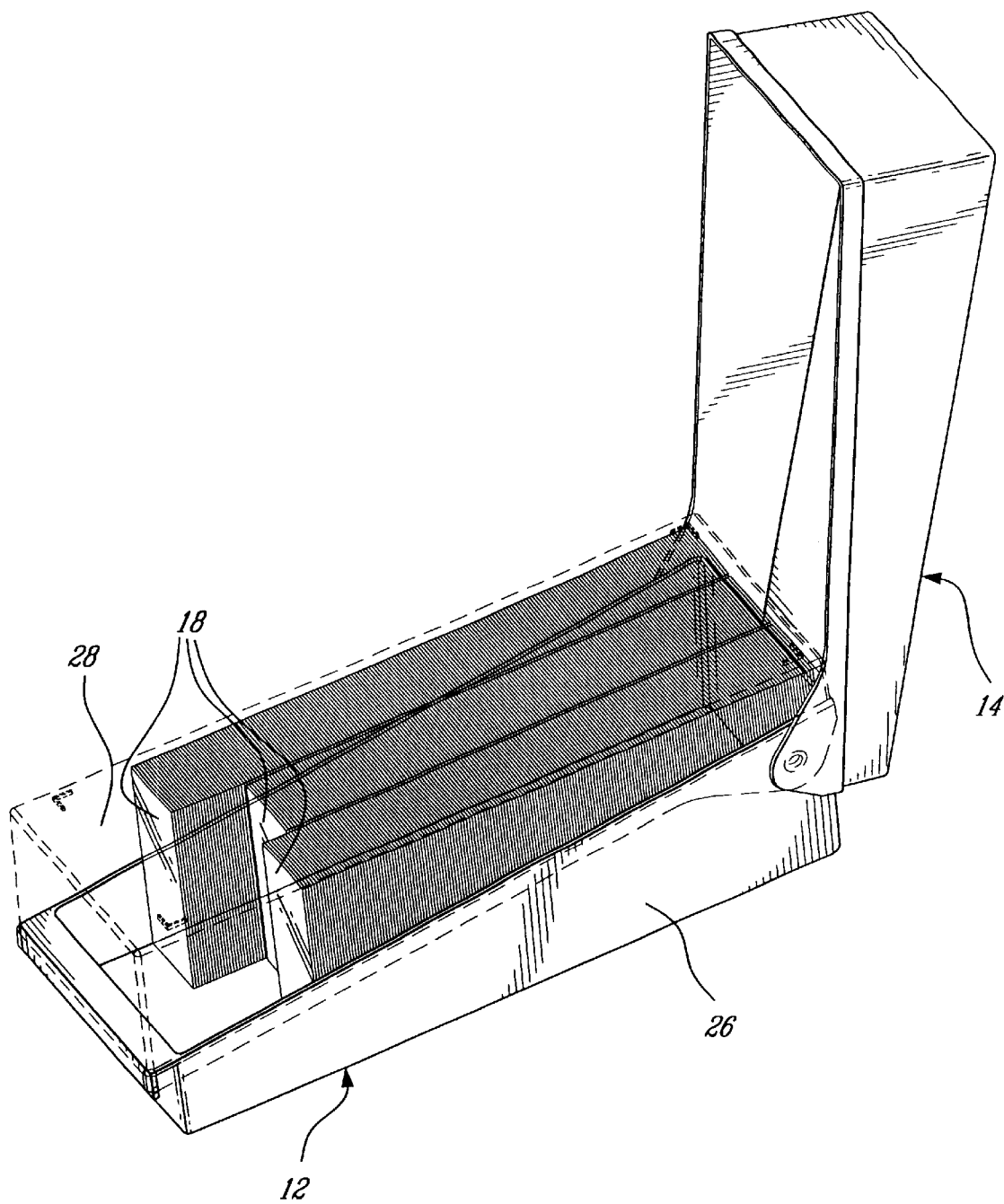
FIG. 6 is a perspective view of the container showing three rows of slides without a tray.

Referring to FIG. 1 of the drawings, a container, generally denoted 10, made in accordance with the present invention comprises a base 12 to which is hingedly mounted a cover 14 and in which is received a tray 16 configured to receive a series of microscopes slides 18.

Referring also to FIG. 2, base 12 consists of a bottom 20, a front wall 22, a rear wall 24 and a pair of opposite side walls 26 and 28. In the embodiment illustrated, the rear wall 24 has a greater height than that of the front wall 22 so that the upper edges of the side walls 26 and 28 downwardly slope from the rear wall to the front wall.

The cover 14 has a top wall 30, a front 32, a rear wall 34 and opposite side walls 36 and 38. The configuration of the cover corresponds to that of the base 12 and has a dimension slightly greater than that of the base so as to fit thereover and form a rectangular configuration in the closed position shown in dotted lines 40. The front wall 32 of the cover is adapted to engage a protruding flange 42 extending from the upper edge of the front wall 22 of the base. Cover 14 is detachably mounted to the base 12.

Tray 16 rests on the bottom 20 of the base. With reference also to FIGS. 3 and 4, the tray 16 comprises a base 44, a front wall 46, a rear wall 48 and opposite side walls 50 and 52. The side walls 50 and 52 define with a longitudinally extending central raised wall 54 a pair of longitudinal compartments into which are placed the microscope slides in the vertical position shown. The top face of wall 54 displays a series of identification numbers each associated with a slide receiving compartment. The slides have a rectangular shape with a pair of opposite short sides and a pair of opposite long sides. The width of each compartment is slightly greater than the distance separating two long sides of a slide. Each compartment comprises a series of longitudinally spaced partitions 60, 62, 64 and 66 that define slide receiving areas on which rests the short side of a slide. Partitions 60 are integral with side wall 52 and the base of the tray while partitions 62 are integral with one side of the central wall 54 of the tray. Partitions 64 are integral with an opposite side of the central wall 54 and the base of the tray while partitions 66 are integral with the base of the tray and the side wall thereof.

As can be seen in FIG. 3, the base 44 of the tray displays in each space between the partitions a series of longitudinally spaced openings 45 and 47 for draining purposes.

The spaces separating the partitions 60, 62, 64 and 66 are equal to one another and correspond to a distance greater than the thickness of a slide so that the slide may be manually pivoted from a rearwardly inclined position to a frontwardly inclined position and vice-versa (see FIG. 2). In a preferred form of the invention, the height of the partitions is about a third of the height of a microscope slide resting upwardly on its short side on the bottom wall of a tray compartment FIG. 5 shows a preferred embodiment of the invention wherein the distance separating two partitions 60 is such as to allow two slides 18 to have their short sides resting on the base 44 of the tray and to also allow the two slides to be pivoted manually from a rearwardly position to a frontwardly rearwardly position and vice-versa (see FIG. 5).

Referring to FIG. 6, the width of the base or the distance separating its two walls 26 and 28 is such that three rows of microscope slides can be received with one of the short sides resting on the bottom wall of the base 12. Hence, for storage, the tray with the slides are removed from the base, the micro slides removed from the tray and placed in three adjacent rows on the base of the container.

As can be seen in FIGS. 2, 3, 4 and 5, the bottom 20 of the container and the top wall 30 of the cover are each provided with integrally formed projections 80, 82 and 84, 86 respectively so that identical containers 10, 10' may be stacked (see FIG. 7).

Although the invention has been described above with respect to various forms, it will be evident that it may be modified and refined in various ways. For example, the cover can be made transparent of plastic material or the like so that the micro slides can be easily seen while the cover is in the closed position. It is therefore wished to have it understood that the present invention should not be limited in interpretation, except by the terms of the following claims.

What is claimed is:

1. A system for storing microscope slides, comprising:
    a plurality of microscope slides of rectangular shape, said microscope slides each having short sides and long sides and a given thickness, and a first one of said short sides bearing information pertaining to a specimen deposited on a respective one of said plurality of microscope slides; and
    a container comprising:
    a base having a bottom wall, front and rear walls and opposite sidewalls;
    a tray removably received on said bottom wall and contained within said front, rear and side walls; said tray including a pair of laterally spaced longitudinally extending slide retaining compartments; each slide retaining compartment including (a) a bottom wall and two opposite side walls and (b) a plurality of longitudinally spaced partitions; wherein two successive partitions in the plurality of longitudinally spaced partitions and the opposite side walls of one of said compartments define a space that is dimensioned to receive a second one of said short sides of one of said microscope slides; said space being greater than said thickness of said slide whereby said slide may be manually moved reciprocally between a rearwardly inclined position and a forwardly inclined position to allow said first short side of said slide to be more easily viewed.

2. A container as defined in claim 1, wherein each said space is slightly greater than the thickness of two slides so as to receive the short sides of two slides between two successive partitions and to allow said two slides to be manually moved reciprocally between forwardly and rearwardly inclined positions.

3. A container as defined in claim 1, wherein said partitions consist of a pair of laterally spaced projections, each projection being integrally formed to said bottom wall of said compartment and a respective side wall of said compartment.

4. A container as defined in claim 1, wherein said opposite sidewalls of said compartments have a height corresponding to about a third of the long sides of the microscope slides when in upstanding position in said compartments.

5. A container as defined in claim 1, wherein the width of the bottom wall of said base between said opposite side walls is slightly greater than the width of three laterally aligned and vertically standing slides so that said slides may be stored in three lateral rows in said base when said tray is removed therefrom.

6. A container as defined in claim 1, comprising a cover hingedly connected to said opposite side walls of said base adjacent said rear wall thereof.

7. A method for storing and accessing microscope slides, the method comprising:
    providing microscope slides of rectangular shape, said microscope slides each having short sides and long sides and a given thickness;
    applying information pertaining to specimens deposited on respective microscope slides on one of the short sides of the respective microscope slides; and
    providing a container comprising:
    a base having a bottom wall, front and rear walls and opposite sidewalls; and
    a tray removably received on said bottom wall and contained within said front, rear and side walls; said tray including a pair of laterally spaced longitudinally extending slide retaining compartments; each slide retaining compartment including (a) a bottom wall and two opposite side walls and (b) a plurality of longitudinally spaced partitions;
    inserting the microscope slides in longitudinally upstanding position in respective slide retaining compartments; and
    manually moving the microscope slides between a rearwardly inclined position and a forwardly inclined position to allow said short sides of said slides with said information pertaining to the specimens to be more easily viewed.

* * * * *